US011961657B2

(12) United States Patent
Lu et al.

(10) Patent No.: US 11,961,657 B2
(45) Date of Patent: Apr. 16, 2024

(54) MULTI-COIL INDUCTOR

(71) Applicant: Delta Electronics (Shanghai) Co., Ltd., Shanghai (CN)

(72) Inventors: Zengyi Lu, Shanghai (CN); Haijun Yang, Shanghai (CN); Shiwei Liu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 13 days.

(21) Appl. No.: 18/151,484

(22) Filed: Jan. 9, 2023

(65) Prior Publication Data

US 2023/0162911 A1 May 25, 2023

Related U.S. Application Data

(62) Division of application No. 16/006,805, filed on Jun. 12, 2018, now Pat. No. 11,621,123.

(30) Foreign Application Priority Data

Oct. 17, 2017 (CN) ......................... 201721349678.6

(51) Int. Cl.

| | |
|---|---|
| ***H01F 27/34*** | (2006.01) |
| ***H01F 27/24*** | (2006.01) |
| ***H01F 27/28*** | (2006.01) |
| ***H01F 27/30*** | (2006.01) |
| ***H01F 27/38*** | (2006.01) |
| ***H01F 37/00*** | (2006.01) |
| *H01F 41/061* | (2016.01) |

(52) U.S. Cl.

CPC ........... *H01F 27/346* (2013.01); *H01F 27/24* (2013.01); *H01F 27/2823* (2013.01); *H01F 27/2847* (2013.01); *H01F 27/306* (2013.01); *H01F 27/38* (2013.01); *H01F 37/00* (2013.01); *H01F 41/061* (2016.01)

(58) Field of Classification Search

CPC ..... H01F 27/346; H01F 27/24; H01F 27/2823

See application file for complete search history.

(56) References Cited

U.S. PATENT DOCUMENTS

| | | | | |
|---|---|---|---|---|
| 6,642,672 | B2 * | 11/2003 | Hu | H01F 27/38 336/212 |
| 9,054,599 | B2 * | 6/2015 | Wei | H02M 7/493 |
| 9,224,530 | B2 * | 12/2015 | Kim | H01F 27/38 |
| 2008/0068118 | A1 * | 3/2008 | Ushijima | H01F 30/04 336/132 |
| 2010/0019875 | A1 * | 1/2010 | Ger | H01F 27/324 336/220 |

(Continued)

*Primary Examiner* — Shawki S Ismail
*Assistant Examiner* — Malcolm Barnes
(74) *Attorney, Agent, or Firm* — CKC & Partners Co., LLC

(57) ABSTRACT

A multi-coil inductor includes a plurality of stacked inductor units. Each of the inductor units comprises: a magnetic core in which a magnetic path is formed; and a plurality of coils which are wound around the magnetic core to form at least one winding pair. Wherein a part of the magnetic path between the adjacent inductor units is shared. In the present invention, the leakage inductance is controlled and the may be magnetic saturation of magnetic core avoided by adjusting series and parallel connections among the coils.

10 Claims, 5 Drawing Sheets

(56) References Cited

U.S. PATENT DOCUMENTS

| | | | | |
|---|---|---|---|---|
| 2011/0063065 | A1* | 3/2011 | Hugues Douglas .... | H01F 27/40 336/170 |
| 2012/0249280 | A1* | 10/2012 | Nussbaum .......... | H01F 27/2804 336/200 |
| 2013/0141199 | A1* | 6/2013 | Hayes ..................... | H01F 38/02 336/5 |
| 2013/0201728 | A1* | 8/2013 | Njiende ................ | H02M 3/335 363/21.04 |
| 2015/0188509 | A1* | 7/2015 | Paepoot ................... | H03H 7/09 336/170 |
| 2015/0200051 | A1* | 7/2015 | Umetani ................. | H01F 27/38 336/178 |
| 2016/0300658 | A1* | 10/2016 | Wu ......................... | H01F 27/24 |
| 2017/0054378 | A1* | 2/2017 | Njiende T ............... | H01F 30/04 |

* cited by examiner

MULTI-COIL INDUCTOR

This is a divisional application of the U.S. application Ser. No. 16/006,805 filed on Jun. 12, 2018, which is based upon and claims priority to Chinese Patent Application No. 201721349678.6, filed on Oct. 17, 2017, and the entire contents thereof are incorporated herein by reference.

TECHNICAL FIELD

The present invention relates to an inductor, particularly, a multi-coil inductor based on flat wire edgewise winding technology.

BACKGROUND

With the widespread use of the switched power supply technology, there is a trend to develop the power supply products with higher efficiency and power density, higher reliability and lower cost. It is effective to achieve the higher power density of the power supply by reducing the volume and weight of the magnetic components, so that various magnetic integration technologies are widely studied. Furthermore, in order to save the manufacturing labor cost, the automatic winding technology, especially the flat wire edgewise winding technology, which is also benefit to reduce the parasitic capacitance, is adopted in more and more kinds of magnetic components.

Due to the limitation of the toroidal core winding process, the coils of the magnetic components in the high power supply are generally wound by the round copper wire winding process. For example, the magnetic components in the high power supply may be inductors, especially common mode EMI (Electromagnetic Interference) inductors. However, the round copper wire winding process has become harder and harder to meet the requirement of the power supply design on components volume reduction and cost saving. The rectangle or square-shaped magnetic cores are more and more used in magnetic components, such that the flat wire edgewise winding technology can be used to achieve the automatic winding.

Referring to FIG. 1, the coils of the first winding 200 and the second winding 300 are wound by the flat wire edgewise winding, which are wound edgewise along the narrow edge and formed in a spring shape. In FIG. 1, the rectangle magnetic core 100 has a combination structure. The first winding 200 and the second winding 300 are mounted on two opposite columns of the magnetic core 100 respectively after they are manufactured, which is beneficial to the simplification of the winding process. But due to the inherent reason of the structure, the coupling between the two windings is poor and the leakage inductance between the two windings is large, such that the saturation of the magnetic core easily occurs. Moreover, the leakage inductance may form a magnetic loop through the air and a part of the magnetic core. So a larger leakage magnetic flux easily interrupts the operation of other peripheral circuit components, and extra loss or EMI issue is caused.

SUMMARY OF THE INVENTION

With respect to the above defect in the prior art, a multi-coil inductor is provided.

In order to obtain the above purpose, the present invention provides a multi-coil inductor comprising a plurality of stacked inductor units. Each of the inductor units comprises:

a magnetic core in which a magnetic path is formed; and a plurality of coils which are wound around the magnetic core to form at least one winding pair;

wherein a part of magnetic path between the adjacent inductor units is shared.

In some embodiments, the plurality of coils are wound around the magnetic core by flat wire using edgewise winding technology.

In some embodiments, the number of the coils of the multi-coil inductor is 2N, and N is an integer larger than or equal to 2.

In some embodiments, the multi-coil inductor comprises two inductor units; wherein the magnetic core is a closed rectangular structure; the coils are respectively wound around two opposite magnetic columns of the magnetic core to form the winding pair; and a middle magnetic path commonly used by the two inductor units is formed by a closed magnetic column.

In some embodiments, the multi-coil inductor comprises two inductor units; wherein the magnetic core is an open rectangular structure; the coils are respectively wound around two opposite magnetic columns of the magnetic core to form the winding pair; a middle magnetic path commonly used by the two inductor units is formed by an open magnetic column, and an opening of the open magnetic column is an air gap.

In some embodiments, the coils in the winding pair are connected in series or in parallel.

In some embodiments, the coils in the winding pair are cross-connected in series or in parallel.

In some embodiments, the coils in winding pairs of the multi-coil inductor are all connected in series or in parallel.

In some embodiments, the coils in different winding pairs are cross-connected in series or in parallel.

In some embodiments, the multi-coil inductor comprises more than two inductor units; wherein the magnetic core is a closed rectangular structure or an open rectangular structure; the coils are respectively wound around two opposite magnetic columns of the magnetic core to form the winding pair; a middle magnetic path commonly used by the adjacent inductor units is formed by a closed magnetic column or an open magnetic column, and an opening of the open magnetic column is an air gap.

In some embodiments, the coils in some winding pairs are connected in series or in parallel.

In some embodiments, the coils in some winding pairs are cross-connected in series or in parallel.

In some embodiments, the plurality of magnetic cores of the plurality of stacked inductor units form a core component, and the core component is formed in one piece.

In some embodiments, the plurality of coils have the same number of turns.

Detailed description is made to the present invention in combination with the drawings and the particular examples, but it is not used as the definition to the present invention.

DETAILED DESCRIPTION OF THE EMBODIMENTS

The description above and below plus the drawings contained herein merely focus on one or more currently preferred embodiment of the present invention and also describe some exemplary optional features and/or alternative embodiments. The description and drawings are presented for the purpose of illustration and, such as, are not limitations of the present invention. Thus, those of ordinary skill in the art would readily recognize variations, modification, and alternatives. Such variations, modifications and alternatives should be understood to be also within the scope of the present invention.

FIG. 2A to FIG. 7 are the structural schematic diagrams of embodiment of the present invention. The multi-coil inductor of the present invention comprises a plurality of stacked inductor units 1, and each of the inductor units comprises a magnetic core 2 and a plurality of coils. A magnetic path is formed in the magnetic core 2. A plurality of coils are wound around the magnetic core 2 to form at least one winding pair, and the coils are wound around the magnetic core 2 in a flat wire edgewise winding. A part of the magnetic paths between the adjacent inductor units is shared. The plurality of magnetic cores 2 of the plurality of stacked inductor units are preferably a core component formed in one piece. The material of the core component may have a lower permeability μe, such as ferro-nickel alloy with the permeability μe 60. Also the material of the core component may have a higher μe, such as ferrite with the permeability μe 3300. In some embodiments, when the inductor of the present invention is used as the common mode EMI inductor, the ferrite material with a higher magnetic permeability (e.g., μe=10000 or the like) may be selected for the inductor to achieve the high impedance characteristics.

Figure 1:
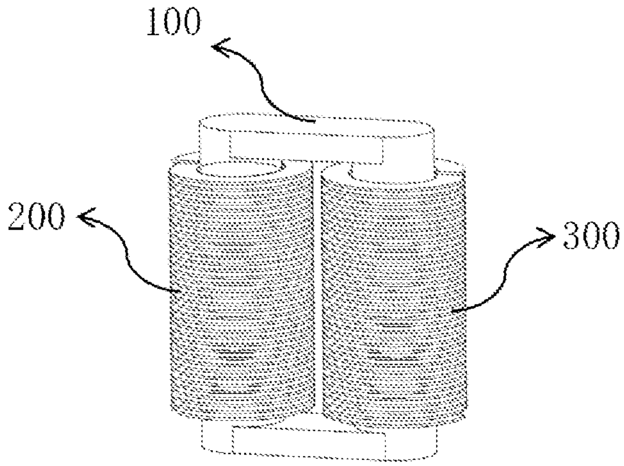
FIG. 1 is a schematic diagram of the flat wire edgewise winding magnetic component in the prior art.
Figure 2A:
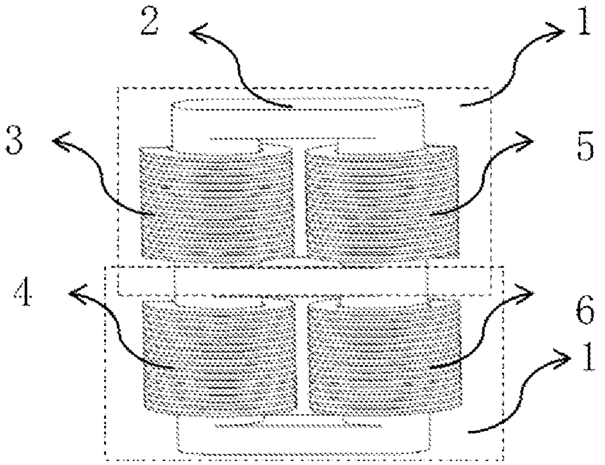
FIG. 2A is a structural schematic diagram of the first embodiment of the present invention.

FIG. 2A is a structural schematic diagram of the first embodiment of the present invention. As shown in FIG. 2A, two inductor units 1 are included. The magnetic core 2 is a closed rectangular structure; the coils are respectively wound around two opposite magnetic columns of the magnetic core 2 to form the winding pair. The two inductor units 1 share a middle magnetic path which is formed by a closed magnetic column. Each of the two inductor units 1 has independent magnetic path except for the middle magnetic column. Referring to FIG. 2A, the first coil 3 and the third coil 5 are included in the winding pair of one inductor unit 1, and the second coil 4 and the fourth coil 6 are included in the winding pair of the other inductor unit 1. Wherein, the coils in the winding pair of the inductor unit 1 may also be connected in series or in parallel to increase the inductance value (or impedance) or enhance the current capacity of coils. And the coils connected in series or in parallel have the same magnetic flux direction. For example, the magnetic flux of the coils is in the anticlockwise direction or in the clockwise direction in the magnetic path.

Figure 2B:
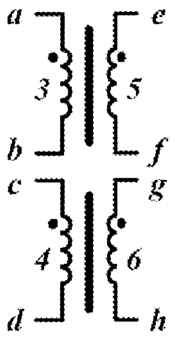
FIGS. 2B, 2C and 2D are schematic diagrams of the coils of FIG. 2A.
Figure 2C:
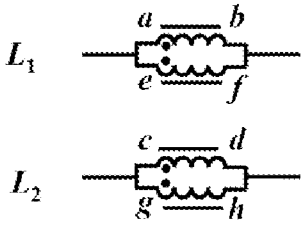
Figure 2D:
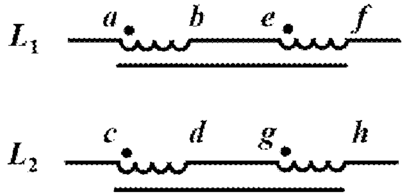

FIG. 2B, FIG. 2C and FIG. 2D are schematic diagrams of the coils of FIG. 2A. Referring to FIG. 2B, the first coil 3 has two pins a and b, the second coil 4 has two pins c and d, the third coil 5 has two pins e and f, and the fourth coil 6 has two pins g and h, which are connected with other circuit components. Since the other circuit components are weakly related to the present disclosure, they are not shown in detail. FIG. 2C shows the schematic diagram of the coils connected in parallel. Referring to FIG. 2C, the pins a and e are connected in parallel and the pins b and f are connected in parallel, which constitutes a inductor L1. Similarly, the pins c and g are connected in parallel and the pins d and h are connected in parallel, which constitutes a inductor L2. FIG. 2D shows the schematic diagram of the coils connected in series. Referring to FIG. 2D, the pins b and e are connected in series, which constitutes the inductor L1. Similarly, the pins d and g are connected in series, which constitutes the inductor L2.

In some embodiments, when the multi-coil inductor is used as the common mode inductor, two coils in any winding pair can be used as two common mode windings of the common mode inductor respectively, such as the coil 3 and the coil 5 or the coil 4 and the coil 6.

It is noted that, when the coils are connected in series, the coils in the winding pair may have different numbers of turns, but more preferably, configured to have the same number of turns in consideration of structure symmetry. For example, the coil 3 and the coil 5 are configured to have the same number of turns when connected in series, and the coil 4 and the coil 6 are configured to have the same number of turns when connected in series. When the coils in the inductor unit 1 are connected in parallel, or the multi-coil inductor is used as the common mode inductor, the coils in the winding pair need to configure to have the same number of turns. For example, the coil 3 and the coil 5 are configured to have the same number of turns, and the coil 4 and the coil 6 are configured to have the same number of turns. It needs to describe that, the number of turns of the coil 3 and the coil 5 may be different from them of the coil 4 and the coil 6, but more preferably, the number of turns of the coil 3 and the coil 5 are configured to be the same as them of the coil 4 and the coil 6.

More preferably, the magnetic flux directions formed by the two inductor units 1 on the shared magnetic path are configured to be opposite with each other, but it is not limited to this. When the magnetic flux on the shared magnetic path has opposite directions, the magnetic flux on the shared magnetic path may be reduced and the sectional area and volume of the shared magnetic column may be reduced. The sectional area of the shared magnetic column may be smaller than the sectional areas of the other magnetic columns in the magnetic path. But in consideration of structure strength and aesthetics, the sectional area of the shared magnetic column may be also configured to be equal to the sectional areas of the other magnetic columns in the inductor unit.

Figure 3A:
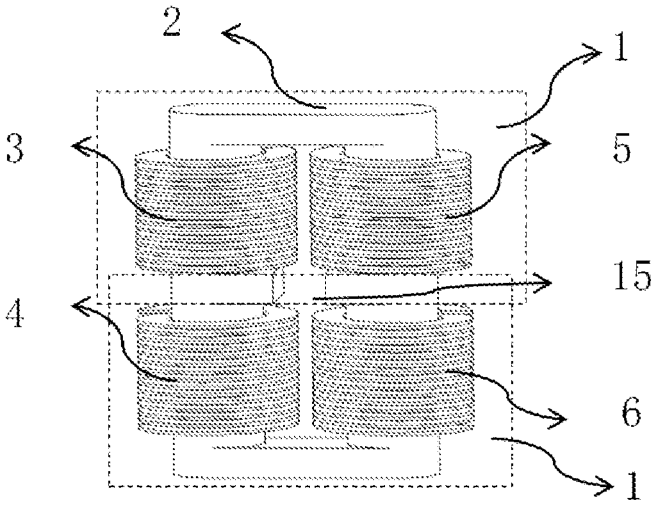
FIG. 3A is a structural schematic diagram of the second embodiment of the present invention.

FIG. 3A is a structural schematic diagram of the second embodiment of the present invention. In the present embodiment, the multi-coil inductor comprises two inductor units 1. The magnetic core 2 is an open rectangular structure; the coils are respectively wound around the two opposite magnetic columns of the magnetic core 2 to form the winding pairs. The two inductor units 1 share a middle magnetic path which is formed by an open magnetic column. An opening of the magnetic column is an air gap 15 and the common middle magnetic path is formed of a part of magnetic core and the air gap. The part of magnetic core may be a protruding portion of a magnetic column around which the coils are wound and has the function of supporting the coils and adjusting the leakage inductance. Wherein, the coils in the winding pairs are connected in series or in parallel. The first coil 3 and the third coil 5 are connected in series or in parallel to be a first winding A; the second coil 4 and the fourth coil 6 are connected in series or in parallel to be a second winding B. The first winding A and the second winding B may be further connected in series or in parallel to be the windings of the inductor in the present embodiment. And the four coils 3 to 6 connected in series may largely increase the inductance (or impedance) or the four coils 3 to 6 connected in parallel may largely enhance the current capacity of coils. More preferably, when the multi-coil inductor is used as the common mode inductor, the first winding A and the second winding B are used as two common mode windings respectively. The leakage inductance between the two common mode windings may be further adjusted by setting the length and width of the shared magnetic column or the size of the air gap, so that the leakage inductance is controlled and the saturation of the magnetic core is avoided.

The coils of the multi-coil inductor may be cross-connected. As shown in FIG. 3A, the first coil 3 and the fourth coil 6 are cross-connected in series or in parallel to constitute the first winding A, and the second coil 4 and the third coil 5 are cross-connected in series or in parallel to constitute the second winding B. The first winding A and the second winding B may be further connected in series or in parallel to be the windings of the inductor in the present embodiment. The first winding A and the second winding B are connected in series to increase the inductance (or impedance), and the first winding A and the second winding B are connected in parallel to enhance the current capacity of coils. More preferably, when the multi-coil inductor is used as the common mode inductor, the first winding A and the second winding B are used as two common mode windings of the common mode inductor respectively. The leakage inductance between the two common mode windings may be adjusted by setting the length and width of the shared magnetic column or the size of the air gap, so that the leakage inductance is controlled and the saturation of the magnetic core is avoided.

Figure 3B:
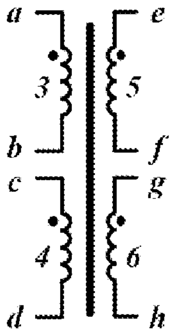
FIGS. 3B, 3C and 3D are schematic diagrams of the coils of FIG. 3A.
Figure 3C:
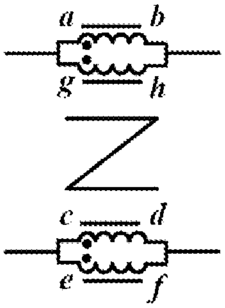
Figure 3D:
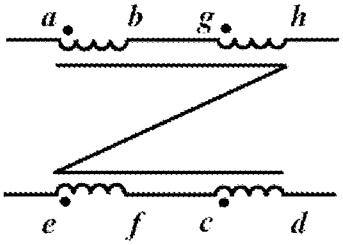

FIG. 3B, FIG. 3C and FIG. 3D are schematic diagrams of the coils of FIG. 3A. Referring to FIG. 3B, the first coil 3 has two pins a and b, the second coil 4 has two pins c and d, the third coil 5 has two pins e and f, and the fourth coil 6 has two pins g and h, which are connected with other circuit components. Since the other circuit components are weakly related to the present disclosure, they are not shown in detail. FIG. 3C shows the schematic diagram of the coils cross-connected in parallel. Referring to FIG. 3C, the pins a and g are cross-connected in parallel and the pins b and h are cross-connected in parallel, which constitutes the first winding A. Similarly, the pins c and e are cross-connected in parallel and the pins d and f are cross-connected in parallel, which constitutes the second winding B. FIG. 3D shows the schematic diagram of the coils cross-connected in series. Referring to FIG. 3D, the pins b and g are cross-connected in series, which constitutes the first winding A. Similarly, the pins f and c are cross-connected in series, which constitutes the second winding B. When the multi-coil inductor is used as the common mode inductor, the first winding A and the second winding B are used as two common mode windings of the common mode inductor respectively.

In the embodiment, the number of turns of the coils is not limited, which can refer to the relevant description in the first embodiment. More preferably, the number of turns is configured to be the same.

Figure 4:
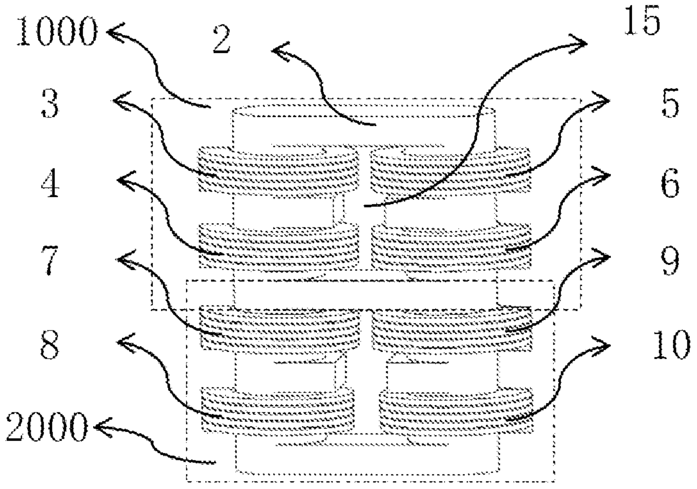
FIG. 4 is a structural schematic diagram of the third embodiment of the present invention.
Figure 5:
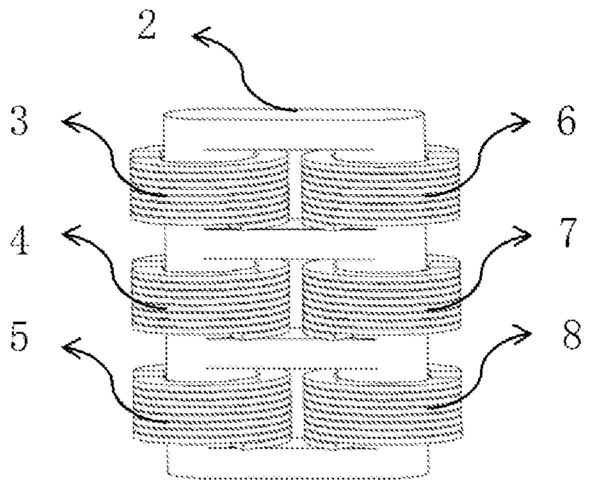
FIG. 5 is a structural schematic diagram of the fourth embodiment of the present invention.
Figure 6:
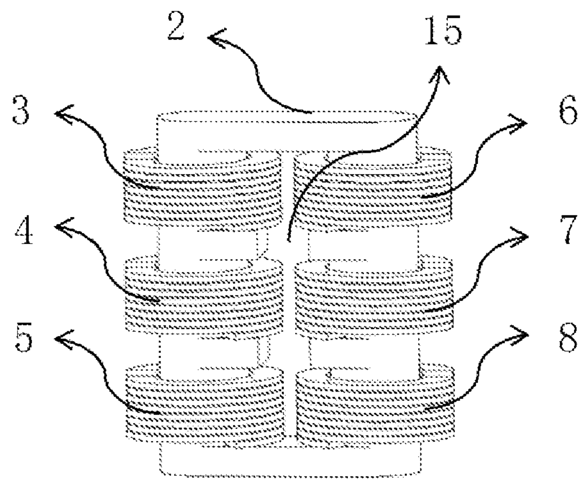
FIG. 6 is a structural schematic diagram of the fifth embodiment of the present invention.
Figure 7:
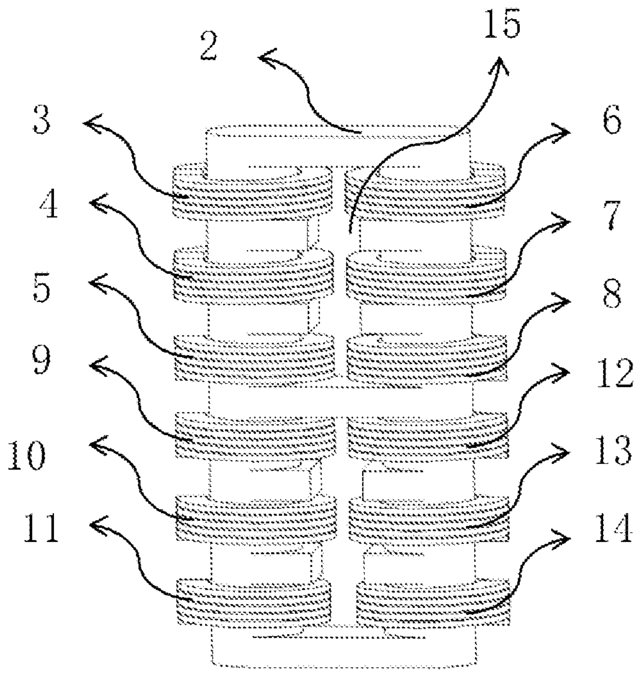
FIG. 7 is a structural schematic diagram of the sixth embodiment of the present invention.

Referring to FIG. 4 to FIG. 7, FIG. 4 is a structural schematic diagram of the third embodiment of the present invention; FIG. 5 is a structural schematic diagram of the fourth embodiment of the present invention; FIG. 6 is a structural schematic diagram of the fifth embodiment of the present invention; and FIG. 7 is a structural schematic diagram of the sixth embodiment of the present invention. In the above embodiments, the multi-coil inductors all include more than two inductor units. The magnetic cores 2 are the closed rectangular structure or the open rectangular structure. The coils are respectively wound around the two opposite magnetic columns of the magnetic core 2 to form the winding pairs. The adjacent inductor units 1 share the middle magnetic path which is formed by the closed magnetic column or the open magnetic column. And the opening of the magnetic column is an air gap 15. Wherein the coils in the winding pairs are connected in series or in parallel, or the coils in the winding pairs are cross-connected in series or in parallel. In some embodiments, the coils in the inductor units are wound by flat wire with edgewise winding technology. Preferably, the plurality of magnetic cores 2 of the plurality of stacked inductor units 1 adopt a core component formed in one piece. The material of the core component may have the lower permeability μe, such as ferro-nickel alloy with the permeability μe 60. The material of the core component may have the high permeability μe, such as the ferrite with the permeability μe 3300. In some embodiments, when the inductor of the present invention is used as the common mode inductor, the material with the high magnetic permeability (e.g., μe=10000 or the like) may be selected for the core component to achieve high impedance characteristics of the common mode inductor.

It needs to describe that the inductor in FIG. 4 may be obtained by stacking two multi-coil inductors of FIG. 3A. In the third embodiment as illustrated in FIG. 4, the coils in some winding pairs of the inductor units 1 may be connected in series or in parallel. Particularly, the first coil 3 and the third coil 5 are connected in series or in parallel to be the first winding A, and the second coil 4 and the fourth coil 6 are connected in series or in parallel to be the second winding B. In another way, the coils in some winding pairs of the inductor units 1 may be cross-connected in series or in parallel. Particularly, the first coil 3 and the fourth coil 6 are cross-connected in series or in parallel to be the first winding A, and the second coil 4 and the third coil 5 are cross-connected in series or in parallel to be the second winding B. The first winding A and the second winding B may be further connected in series or in parallel to be the windings of the first inductor 1000 (the upper inductor). In the embodiment, when the first inductor 1000 is used as common mode inductor, the first winding A and the second winding B are used as two common mode windings of the first common mode inductor respectively.

The fifth coil 7 and the seventh coil 9 are connected in series or in parallel to be the third winding C, and the sixth coil 8 and the eighth coil 10 are connected in series or in parallel to be the fourth winding D. In another way, the fifth coil 7 and the eighth coil 10 are cross-connected in series or in parallel to be the third winding C, and the sixth coil 8 and the seventh coil 9 are cross-connected in series or in parallel to be the fourth winding D. The third winding C and the fourth winding D may be further connected in series or in parallel to form the working windings of the second inductor 2000 (the lower inductor). In the embodiment, when the second inductor 2000 is used as common mode inductor, the third winding C and the fourth winding D form two common mode windings of the second common mode inductor respectively. Preferably, the magnetic flux directions of the closed magnetic column shared by the first inductor 1000 and the second inductor 2000 are opposite with each other. Herein, the sectional area and volume of the shared magnetic column are reduced. In the embodiment, the structure and the number of turns of the coils can refer to the relevant description of the first embodiment, which is not described in detail here.

In the fourth embodiment as illustrated in FIG. 5, each of the inductor units 1 has independent magnetic path except for the middle magnetic column. The first coil 3 and the fourth coil 6 are included in the winding pair of one inductor unit 1, the second coil 4 and the fifth coil 7 are included in the winding pair of another inductor unit 1, and the third coil 5 and the sixth coil 8 are included in the winding pair of another inductor unit 1. Herein, the magnetic integration of three inductor units 1 is constituted. More preferably, the coils are wound by flat wire with edgewise winding technology, the magnetic cores 2 are formed in one piece, and the magnetic flux directions of the magnetic column shared by the adjacent inductor units are configured to be opposite with each other. Since the structure and use of the multi-coil inductor in the embodiment are similar with that in FIGS. 2A-2D, further explanation is omitted herein for the sake of brevity.

In the fifth embodiment as illustrated in FIG. 6, a part of the middle magnetic path is made of air. Further, the first coil 3, the third coil 5 and the fifth coil 7 are cross-connected in series or in parallel to be the first winding A, and the second coil 4, the fourth coil 6 and the sixth coil 8 are cross-connected in series or in parallel to be the second winding B. More preferably, when the inductor is used as common mode inductor, the first winding A and the second winding B may be used as the common mode windings of the common mode inductor respectively. Since the structure and use of the inductor in the embodiment are similar with that in FIGS. 3A-3D, further explanation is omitted herein for the sake of brevity.

In the sixth embodiment as illustrated in FIG. 7, the first coil 3, the third coil 5 and the fifth coil 7 are cross-connected in series or in parallel to be the first winding A, the second coil 4, the fourth coil 6 and the sixth coil 8 are cross-connected in series or in parallel to be the second winding B, the seventh coil 9, the ninth coil 11 and the eleventh coil 13 are cross-connected in series or in parallel to be the third winding C; and the eighth coil 10, the tenth coil 12 and the twelfth coil 14 are cross-connected in series or in parallel to be the fourth winding D. In the embodiment, when the multi-coil inductor is used as common mode inductor, the first winding A and the second winding B may be used as the common mode windings of the first common mode inductor respectively, and the third winding C and the fourth winding D may be used as the common mode windings of the second common mode inductor respectively. More preferably, the coils are wound by flat wire with edgewise winding technology, the magnetic cores 2 are formed in one piece, and the magnetic flux directions of the magnetic column shared by the adjacent inductor units are configured to be opposite with each other. It needs to describe that the inductor in FIG. 7 may be obtained by stacking two inductors of FIG. 6. Since the structure and use of the multi-coil inductor in the embodiment are similar with that in FIGS. 4 and 6, further explanation is omitted herein for the sake of brevity.

In the present invention, 2 or 2n coils are wound around two opposite magnetic columns of the magnetic core respectively, and the coils on one magnetic column are connected with the coils on the other magnetic column. Specifically, the coils on one magnetic column are connected with the coils on the other magnetic column in series or in parallel. n is an integer larger than or equal to 2. The leakage inductance is controlled by changing the connection methods among these coils. That is to say the leakage inductance is controlled by adjusting the coupling among these coils by different connections.

In the present invention, the number of coils included in the multi-coil inductor is an even number. Particularly, the number of coils is 2N, and N is an integer larger than or equal to 2. For example, the number of coils in FIG. 2A and FIG. 3A is 4; the number of coils in FIG. 4 is 8; and the number of coils in FIG. 5 and FIG. 6 is 6. The combinations among the 2N coils are flexible. Specifically, these coils can be connected in series or in parallel, or cross-connected in series or in parallel. Herein, the leakage inductance is controlled by adjusting the coupling among the coils.

In the present invention, in inductor units may be stacked together, and in is an integer larger than or equal to 2. A part of magnetic path of adjacent inductor units is shared to reduce the volume and weight of the magnetic component. Among these inductor units, the magnetic cores with the open rectangular structure and (or) the magnetic cores with the closed rectangular structure may be combined and arranged arbitrarily.

In the present invention, the plurality of magnetic cores of the plurality of stacked inductor units form a core component, and the core component is formed in one piece. Preferably, the core component is a ferrite component formed in one piece. When the core is manufactured, a plurality of coils are wound around the predetermined positions of the magnetic cores by a machine. Herein, the plurality of coils are wound around the magnetic columns of the magnetic cores by flat wire with edgewise winding technology. Preferably, when the multi-coil inductor is manufactured, the flat wire is edgewise wound around magnetic columns of the core directly. The magnetic column of the adjacent inductor units is shared. Not only the volume and weight of the magnetic component can be reduced, but the coils wound around other magnetic columns can be supported and fixed by the shared magnetic column to enhance the mechanical stability of the magnetic assembly.

Throughout the description and drawings, numerous exemplary were given with reference to specific configurations. It will be appreciated by those of ordinary skill in the art that the present invention can be embodied in numerous other specific forms and those of ordinary skill in the art would be able to practice such other embodiments without undue experimentation. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

What is claimed is:

1. A multi-coil inductor, comprising a plurality of stacked inductor units, each of the inductor units comprising:

a magnetic core in which a magnetic path is formed; and a plurality of coils wound around the magnetic core to form at least one winding pair; wherein a magnetic path between adjacent inductor units is shared and the magnetic path shared by the adjacent inductor units comprises an opening;

wherein the magnetic flux on the magnetic path shared by the adjacent inductor units has opposite directions, and a sectional area of a common magnetic column is equal to or smaller than sectional areas of other magnetic columns in the magnetic path.

2. The multi-coil inductor according to claim 1, wherein the plurality of coils are wound around the magnetic core by flat wire using edgewise winding technology.

3. The multi-coil inductor according to claim 1, wherein the number of the coils of the multi-coil inductor is 2N, and N is an integer larger than or equal to 2.

4. The multi-coil inductor according to claim 1, wherein the coils in winding pairs of the multi-coil inductor are all connected in series or in parallel.

5. The multi-coil inductor according to claim 1, wherein the coils in different winding pairs are cross-connected in series or in parallel.

6. The multi-coil inductor according to claim 1, wherein the plurality of magnetic cores of the plurality of stacked inductor units form a core component, and the core component is formed in one piece.

7. The multi-coil inductor according to claim 1, wherein the plurality of coils have the same number of turns.

8. The multi-coil inductor according to claim 1, wherein the magnetic path shared by the adjacent inductor units is formed by an open magnetic column.

9. The multi-coil inductor according to claim 8, wherein the opening of the magnetic path shared by the adjacent inductor units is an opening of the open magnetic column.

10. The multi-coil inductor according to claim 9, wherein the opening of the open magnetic column is an air gap.

* * * * *